US011362732B2

(12) United States Patent
Wendling

(10) Patent No.: US 11,362,732 B2
(45) Date of Patent: Jun. 14, 2022

(54) DUAL LEO SATELLITE SYSTEM AND METHOD FOR GLOBAL COVERAGE

(71) Applicant: TELESAT TECHNOLOGY CORPORATION, Ottawa (CA)

(72) Inventor: David Wendling, Ottawa (CA)

(73) Assignee: TELESAT TECHNOLOGY CORPORATION, Ottawa (CA)

( * ) Notice: Subject to any disclaimer, the term of this patent is extended or adjusted under 35 U.S.C. 154(b) by 99 days.

(21) Appl. No.: 16/093,260

(22) PCT Filed: Apr. 18, 2017

(86) PCT No.: PCT/CA2017/050476
§ 371 (c)(1),
(2) Date: Oct. 12, 2018

(87) PCT Pub. No.: WO2017/177343
PCT Pub. Date: Oct. 19, 2017

(65) Prior Publication Data
US 2019/0181946 A1    Jun. 13, 2019

(30) Foreign Application Priority Data

Apr. 14, 2016 (CA) ................................ CA 2927217

(51) Int. Cl.
*H04B 7/185* (2006.01)
*H04B 7/195* (2006.01)
(Continued)

(52) U.S. Cl.
CPC ......... *H04B 7/18521* (2013.01); *H04B 7/185* (2013.01); *H04B 7/18513* (2013.01);
(Continued)

(58) Field of Classification Search
CPC ................ H04B 7/185; H04B 7/18513; H04B 7/18521; H04B 7/18534; H04B 7/18578;
(Continued)

(56) References Cited

U.S. PATENT DOCUMENTS

| 5,666,648 A | * | 9/1997 | Stuart | ................ | H04B 7/18576 342/352 |
| 5,678,175 A | * | 10/1997 | Stuart | .................... | H04B 7/195 244/158.4 |

(Continued)

OTHER PUBLICATIONS

PCT Search Report and Written Opinion issued in PCT/CA2017/050476.

(Continued)

*Primary Examiner* — Ankur Jain
(74) *Attorney, Agent, or Firm* — Greenblum & Bernstein, P.L.C.

(57) ABSTRACT

The present invention relates to satellite systems and more particularly, to the provision of a satellite system and method for communications applications, with global coverage. An optimal method of providing global broadband connectivity has been discovered which uses two different LEO constellations with inter-satellite links among the satellites in each constellation, and inter-satellite links between the constellations. The first constellation is deployed in a polar LEO orbit with a preferred inclination of 99.5 degrees and a preferred altitude of 1000 km. The second constellation is deployed in an inclined LEO orbit with a preferred inclination of 37.4 degrees and a preferred altitude of 1250 km.

18 Claims, 9 Drawing Sheets

(51) Int. Cl.
*H04H 20/74* (2008.01)
*H04H 20/91* (2008.01)
*H04W 84/06* (2009.01)

(52) U.S. Cl.
CPC ..... *H04B 7/18534* (2013.01); *H04B 7/18578* (2013.01); *H04B 7/195* (2013.01); *H04H 20/74* (2013.01); *H04H 20/91* (2013.01); *H04W 84/06* (2013.01)

(58) Field of Classification Search
CPC ........ H04B 7/195; H04H 20/74; H04H 20/91; H04W 84/06
See application file for complete search history.

(56) References Cited

U.S. PATENT DOCUMENTS

| | | | | |
|---|---|---|---|---|
| 5,752,187 | A * | 5/1998 | Frank | H04B 7/18541 370/316 |
| 6,034,634 | A * | 3/2000 | Karlsson | H04B 7/18571 342/359 |
| 6,104,911 | A | 8/2000 | Diekelman | |
| 6,249,513 | B1 * | 6/2001 | Malarky | H04B 7/18521 370/316 |
| 9,391,702 | B2 | 7/2016 | Wyler | |
| 2007/0178833 | A1 | 8/2007 | Wahlberg | |
| 2011/0169688 | A1 * | 7/2011 | Wyler | H04B 7/2041 342/354 |
| 2012/0184208 | A1 * | 7/2012 | Renouard | H04B 7/18521 455/12.1 |
| 2014/0341586 | A1 | 11/2014 | Wyler | |
| 2015/0162975 | A1 * | 6/2015 | Jalali | H04B 7/18517 455/12.1 |
| 2016/0094288 | A1 * | 3/2016 | Krebs | H04B 7/18521 455/12.1 |
| 2016/0149599 | A1 * | 5/2016 | Lindsay | H04B 7/195 455/13.1 |
| 2017/0005719 | A1 | 1/2017 | Krebs | |
| 2017/0006620 | A1 * | 1/2017 | Reis | H04L 43/16 |

OTHER PUBLICATIONS

EPO Search Report issued in EPO 17781696 dated Oct. 31, 2019.
Article entitled Mobile Satellite Communications (XP000474895) by W.W. Wu et al. dated Sep. 1994.

* cited by examiner

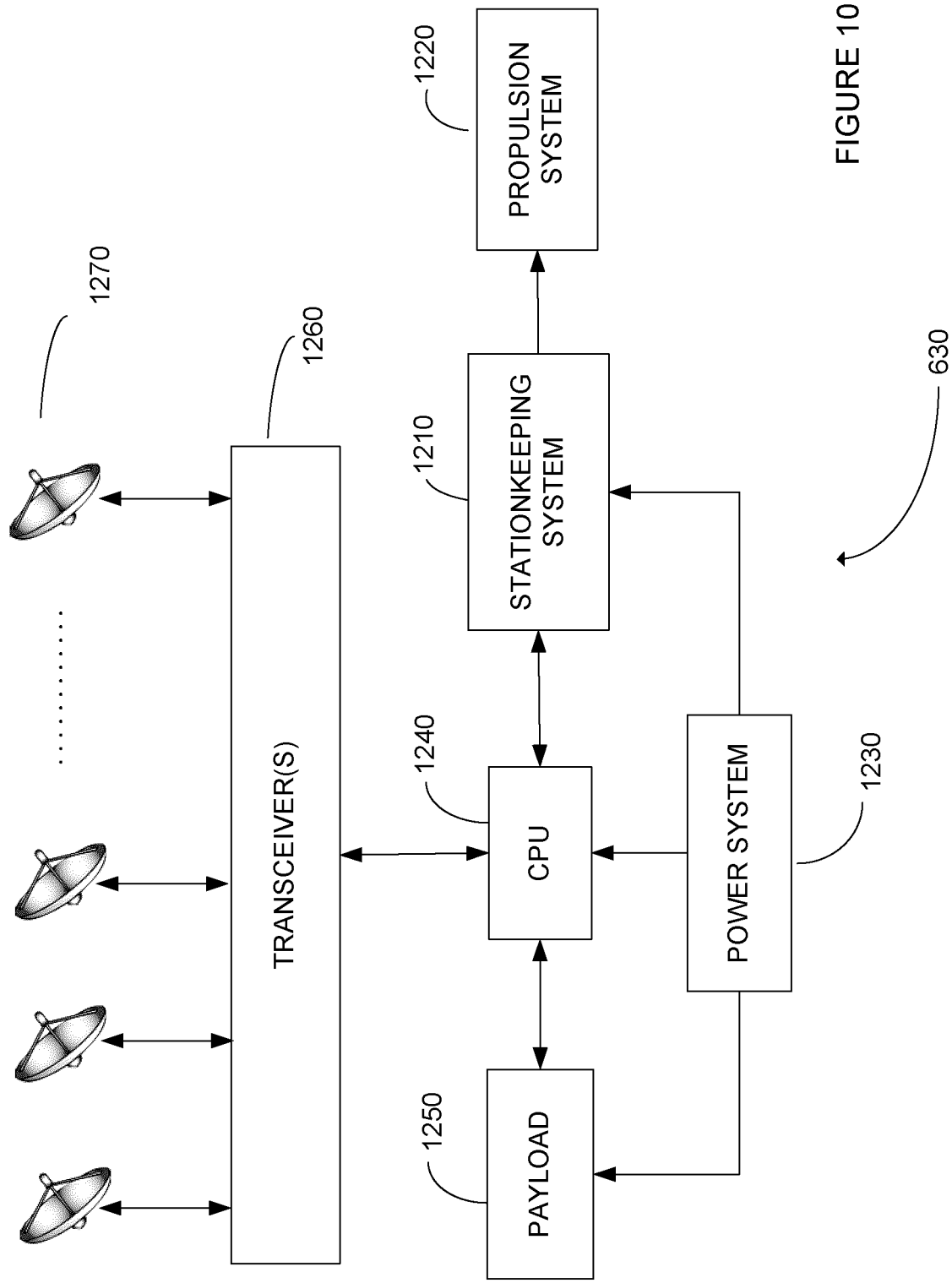

DUAL LEO SATELLITE SYSTEM AND METHOD FOR GLOBAL COVERAGE

CROSS-REFERENCE TO RELATED APPLICATIONS

The instant application is a US National Stage Application based on International Patent Application No. PCT/CA2017/050476 filed Apr. 18, 2017 and published as WO2017/177343 on Oct. 19, 2017. The present application also claims the benefit of Canadian Application No. 2,927,217 filed Apr. 14, 2016.

FIELD OF INVENTION

The present invention relates to satellite systems and more particularly, to the provision of a satellite system and method for communications applications, with global coverage.

BACKGROUND OF THE INVENTION

There is a huge demand for wireless communications world-wide, at every level. Commercial and personal demand for Smartphones, tablets, and the like, continue to grow, as do the number and variety of military and aeronautical applications. As well, the demand for ever increasing bandwidth is also growing as customers expect to have access to high-bandwidth services such as video-conferencing, video on demand, broadcast and multimedia Internet services no matter where they are, and whether or not they are mobile.

The need for access and bandwidth is not limited to highly populated areas. Many governments and communications authorities have expressed an interest in providing the same access to communications services in rural and sparsely populated areas that are enjoyed in urban areas. Even without such regulatory pressure, communication system providers recognize the large market that is currently unserved in many regions of the world, and the business opportunity that this presents to them. Satellite communications systems can provide broadband services to remote areas, but they have a very substantial cost. Thus, there is a great interest in satellite systems which are efficient and cost-effective.

Satellite systems can be categorized generally into four groups, based on the orbits that they use: Geostationary Earth Orbits (GEO), Highly Elliptical Orbits (HEO), Medium Earth Orbits (MEO) and Low Earth Orbits (LEO).

GEO satellites appear to be motionless in the sky, providing the satellite with a continuous view of a given area on the surface of the Earth. Unfortunately, such an orbit can only be obtained by placing the satellite directly above the Earth's equator (0° latitude), with a period equal to the Earth's rotational period, and which requires an altitude of 35,789 km. While such orbits are useful in many applications, they are very poor at covering higher latitudes, not being very useful above 70° latitude for reliable mobile communications. GEO communications satellite links become unreliable or fail as the elevation angle to the satellite decreases with increasing latitude (elevation angle refers to the line-of-sight angle between the user on the ground and the satellite as measured from the horizon). As well, GEO satellites have latency issues, i.e. they introduce a considerable time delay in the transmission of data as signals travel back and forth between the ground-based devices and the satellite in orbit. They also require higher powered communication components and larger antennas than other satellite systems due to the greater distance from the Earth. The higher power requirements and larger antennas result in increased cost of the satellites, and the increased satellite mass and higher orbit altitude increase the cost of launching into this orbit.

HEO satellites can provide better coverage of high latitudes than GEO satellites, but they have other shortcomings. HEO orbits are those in which one of the foci of the orbit is the centre of the Earth, the speed of the satellite being a declining function of the distance from the focus. That is, an HEO satellite will travel closer to the Earth during one part of its orbit (the perigee) causing it to travel very quickly at that time, while at the other end of the orbit (the apogee), it will travel more slowly. Thus, HEO orbits are designed so that the satellites move relatively slowly over areas of interest, and quickly over areas that are not of interest. However, some HEO orbits pass through the Van Allen belts, which expose them to high levels of radiation, reducing the life of the satellite. Also, HEO satellites have an apogee approximately the same distance from the Earth as GEO satellites, thus incurring similar latency issues.

MEO satellites follow circular orbits between LEO and GEO constellations. While there are several definitions, MEO orbits are generally considered to be between 3,000 kilometres and 35,000 kilometres in altitude. While MEO constellations can provide better coverage at higher latitudes than GEO satellites and do so with shorter signal latency, a large number of MEO satellites would be required to provide world-wide coverage. Because of their higher altitude than LEO satellites, MEO satellites must have higher powered communications systems and larger antennas than LEO satellites, to overcome the longer signal path lengths. O3b Networks Ltd. has a constellation of twelve Internet satellites in a MEO orbit around the equator at an altitude of 8,000 kilometres. But because these satellites are deployed in an equatorial orbit, they are not effective for communications above a latitude of about 45 degrees north or south. The Global Positioning System (GPS) is a MEO system of 44 satellites using an altitude of approximately 20,200 kilometres, which conveniently yields an orbital period of 12 hours. The GPS constellation is inclined at 55 degrees so it has better coverage near the poles than the O3b system, but its performance does degrade as one approaches the poles.

LEO satellites are placed in circular orbits at low altitudes of less than 2,000 km. A constellation of LEO satellites can provide continuous world-wide coverage but this requires many satellites as each one is over a given region for a relatively small amount of time. Because of their relative lower distance to the Earth, latency, the delay caused by the distance a signal must travel, is far less than all other orbits. The latency for LEO is approximately 40 msec while for GEO it is 250 msec. Latency is an increasingly important factor in broadband Internet communications.

There are no operational broadband LEO satellite systems, although several have been proposed, such as those described in U.S. Pat. No. 9,391,702 (by Wyler) and United States Patent Publication No. US2017/0005719 (by Krebs). Because of the way these systems are designed, they are both quite expensive. The Krebs system, for example, requires between 841 and 1218 satellites (see paragraph [0040] of US2017/0005719), while the Wyler system requires about 1250 satellites (see column 5 at line 24 of U.S. Pat. No. 9,391,702). And if one wished to increase the number of communication channels available on the Krebs and Wyler systems, one would have to do so in very large and expensive increments, adding hundreds of new satellites at a time (i.e. one basically needs to double the number of planes, or add a new set of satellites equal to the number in the initial constellation).

There is therefore a need for an improved satellite system and methods for providing global coverage, particularly for broadband communications applications.

SUMMARY OF THE INVENTION

It is an object of the invention to provide an improved satellite system and method for providing global communication coverage, which mitigates upon the problems described above.

An advantageous method of providing global broadband connectivity has been discovered which uses two different LEO constellations with inter-satellite links among the satellites in each constellation, and inter-satellite links between the two LEO constellations. The first constellation is deployed in a polar LEO constellation with a preferred inclination of 99.5 degrees and a preferred altitude of 1000 km. The second constellation is deployed in an inclined LEO constellation with a preferred inclination of 37.4 degrees and a preferred altitude of 1250 km. In this constellation the satellites are distributed above the equatorial region and middle latitudes, and can provide coverage between the latitudes 50 degrees North and 50 degrees South, at a minimum elevation angle of 10 degrees.

The polar LEO constellation and inclined LEO constellation work together as a hybrid constellation to achieve true global coverage, with a minimum elevation angle of approximately 20 degrees, requiring fewer satellites than that required by a single LEO constellation at a similar altitude. For example, using only a polar LEO constellation as described above, one would need 168 satellites to provide global coverage at minimum 20 degrees elevation angle. In comparison, the hybrid constellation of the invention only requires 117 satellites. A minimum elevation angle of approximately 20 degrees is preferred as this allows the use of electronically scanned array antennas at the user terminal. It improves the quality and efficiency of the link as the distance between the user and the satellite is less with higher elevation angles and the signal incurs less atmospheric attenuation, an important factor at higher frequencies such as Ka-band. Additional satellites can be added gradually, possibly as the demand increases, resulting in better look angles corresponding to an increase in robustness of the link.

It is a regulatory requirement that NGSO (non-geostationary satellite orbit) satellites cannot cause interference to, nor claim protection from, GEO satellites. The polar LEO constellation and inclined LEO constellation described herein work together to avoid interference to GEO satellites. The polar LEO constellation and inclined LEO constellation of the invention avoid interfering with GEO satellites by connecting to a user terminal only when exceeding a minimum discrimination angle between the LEO satellite and a given GEO satellite, as measured at the GEO user terminal. The discrimination angle is calculated on the basis of unacceptable interference levels as determined by the ITU. The need for LEO satellites to avoid interference with GEO satellites occurs more commonly above the equatorial region and mid-latitudes. The mitigation technique used to avoid interference is switching the LEO user terminal to an alternate LEO satellite, one with an angular separation from the GEO satellite greater than the discrimination angle. With the combination of the polar and inclined orbits there is a much greater probability there will be a suitable alternate LEO satellite.

Communications satellites in the polar LEO constellation of the invention will have excess capacity at higher latitudes because their orbit planes are closer together and the user traffic demand is lower. Excess capacity in the polar LEO constellation at the higher latitudes is used to transfer user traffic, via ISL (inter-satellite link), from both LEO constellations to Gateways located in the North for connection to existing terrestrial networks. A very small number of Northern Gateway sites are required (typically two) as a Gateway site can connect to satellites in more than one plane (see FIG. 1).

Users normally connect to the satellite systems through one of the high capacity narrow steerable beams on the satellite. By using narrow steerable beams, the satellite's resources, in terms of power and bandwidth, can be concentrated where the markets are located. It has been observed that land mass only accounts for about 30% of the Earth's surface, and further, that most of the human population resides in 6% of the surface area. Thus, it is not an efficient use of resources to provide broadband coverage over 100% of the Earth's surface, all of the time, as many prior art systems try to achieve. To ensure all users can monitor and gain access to the satellite network anywhere on the Earth when located in areas not served by narrower, high capacity steerable beams, each satellite will have a Wide Area Coverage beam serve the satellite's entire field of view. The Wide Area Coverage beam, with lower capacity than a narrow steerable beam, allows for more robust network management and user on-demand requests for a high capacity beam coverage. That is, a user terminal in an area currently not served by a narrow high capacity beam is able to contact a satellite via the Wide Area Coverage beam and request access to the satellite via a higher bandwidth, narrow steerable beam. The Wide Area Coverage beams, which cover the entire globe continuously, also allow broadcast type services, such as pushing IP content to the user terminal and software distribution.

In one embodiment of the invention there is provided a satellite system for global communications comprising: a first set of satellites in a polar LEO (low Earth orbit) constellation; a second set of satellites in an inclined LEO constellation; a user terminal for transmitting to, and receiving signals from, the first and second set of satellites; and a Gateway for transmitting to, and receiving signals from, the first and second set of satellites; each of the first and second set of satellites having ISL (inter-satellite link) functionality with respect to satellites in the same constellation and with satellites in the other constellation.

In another embodiment of the invention there is provided a satellite communications system comprising: a set of satellites in a LEO (low Earth orbit) constellation; a user terminal for transmitting to, and receiving signals from, the set of satellites; and a Gateway for transmitting to, and receiving signals from, the set of satellites; each of the set of satellites being operable to: transmit and receive signals via a Wide Area Coverage beam; receive a request from the user terminal for high-capacity beam coverage; and respond to receiving the request from the user terminal for high-capacity beam coverage by switching the user terminal to a higher bandwidth, narrow, steerable beam, pointed towards the requesting user terminal.

In a further embodiment of the invention there is provided a method of operation for a global communications satellite system for comprising: launching a first set of satellites in a polar LEO (low Earth orbit) constellation; launching a second set of satellites in an inclined LEO constellation; using a user terminal, transmitting communications data to a first satellite in the first or second set of satellites; communicating the communications data from the first satellite, to a second satellite in the first or second set of satellites using ISL (inter-satellite link); and transmitting the communications data from the second satellite, to a polar Gateway.

In a still further embodiment of the invention there is provided a method of operation for a satellite communications system comprising: launching a set of satellites in a LEO (low Earth orbit) constellation; using a user terminal, transmitting to and receiving signals from, the set of satellites; using a Gateway, transmitting to and receiving signals from, the set of satellites; at least one of the set of satellites: transmitting and receiving signals via a Wide Area Coverage beam; receiving a request from the user terminal for high-capacity beam coverage; and responding to receiving the request from the user terminal for high-capacity beam coverage by switching the user terminal to a higher bandwidth, narrow, steerable beam, pointed towards the requesting user terminal.

Other aspects and features of the present invention will be apparent to those of ordinary skill in the art from a review of the following detailed description when considered in conjunction with the drawings.

BRIEF DESCRIPTION OF THE DRAWINGS

These and other features of the invention will become more apparent from the following description in which reference is made to the appended drawings wherein:

FIG. 10 presents a block diagram of an exemplary satellite in an embodiment of the invention.

Similar reference numerals have been used in different figures to denote similar components.

DETAILED DESCRIPTION

The LEO hybrid constellation of the invention consists of two mutually-supporting constellations: a polar LEO constellation and an inclined LEO constellation. Complete global, broadband communication coverage with a minimum elevation angle of approximately 20 degrees can be provided with a total of 117 satellites, 72 in the polar LEO constellation and 45 in the inclined LEO constellation. Unlike other proposed LEO systems, initial service to any point on the globe can begin with a much smaller number of satellites; the completion of the polar constellation of 72 satellites, which provides global coverage with a minimum elevation angle of approximately 12 degrees. The subsequent launch of the inclined constellation of 45 satellites will increase the minimum elevation angle to approximately 20 degrees.

Figure 1:
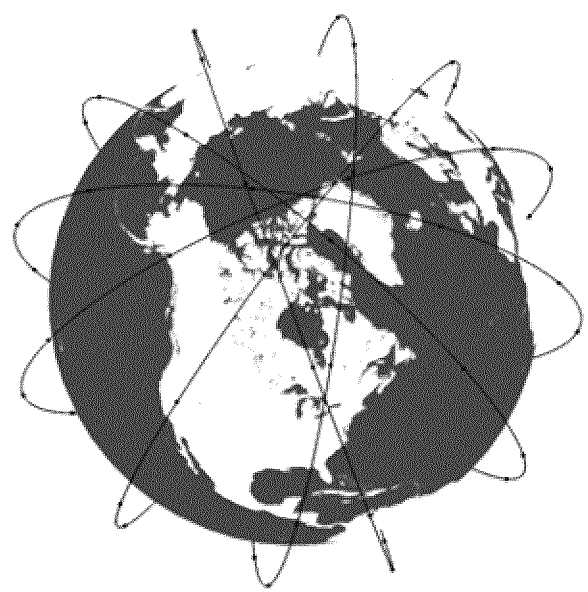
FIG. 1 presents a simplified representation of a polar LEO constellation of 12 satellites in six planes.

In the preferred embodiment the polar LEO constellation (see FIG. 1) is deployed to the following parameters:
  Constellation of 72 satellites, plus spares
  12 satellites in each of 6 planes, the planes being equally spaced (i.e. 30 degrees between adjacent planes)
  Planes are inclined 99.5 degrees
  Orbit altitude is 1000 km The constellation of 72 satellites can be increased by adding individual satellites to each plane or by adding additional planes, then adjusting the location of the satellites within the constellation to once again achieve a distribution optimized for coverage.

Figure 2:
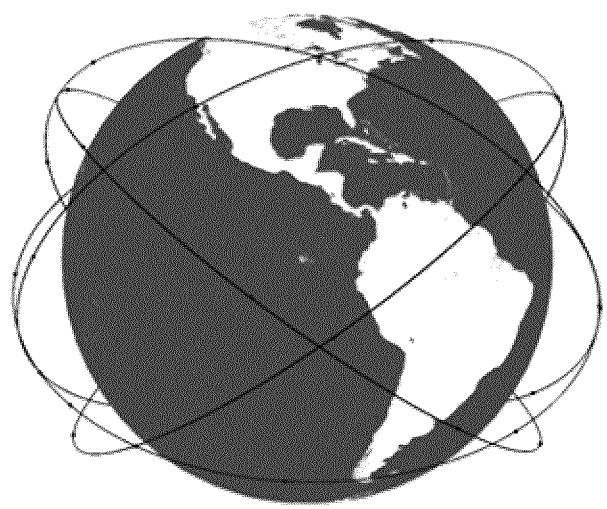
FIG. 2 presents a simplified representation of an inclined LEO constellation of 9 satellites in five planes.

In the preferred embodiment the inclined LEO constellation (see FIG. 2) is deployed to the following parameters:
  Constellation of 45 satellites, plus spares
  9 satellites in each of 5 planes, the planes being equally spaced (i.e. 36 degrees between adjacent planes)
  Planes are inclined 37.4 degrees
  Orbit altitude is 1250 km The constellation of 45 satellites can be increased by adding individual satellites to each plane or by adding additional planes, then adjusting the location of the satellites within the constellation to once again achieve a distribution optimized for coverage. Since the market is concentrated within the coverage area of the inclined LEO constellation, rather than adding satellites to the polar LEO constellation, one can more efficiently increase the capacity to meet a growing market by adding satellites to the inclined LEO constellation, either individual satellites to each plane or additional planes.

The redundancy on each satellite may be reduced, with the benefit of reduced costs and the required system availability maintained, by adding a spare satellite to each plane. This additional satellite will be operational and all satellites in a plane will be equally spaced, increasing the overall system capacity. Should a satellite fail, the loss of coverage normally provided by the failed satellite is quickly replaced by rephasing the remaining satellites in the plane to have them equally spaced. The time to rephase the satellites has been calculated to be approximately one day, requiring 3% additional station keeping fuel.

To meet growing market demand satellites can be added to each plane or additional planes may be added to either the polar LEO constellation or the inclined LEO constellation. For example, by increasing the number of satellites in each plane by one (a total of 11 additional satellites), system capacity will increase by approximately 9%. In another example, by adding 5 planes between the initial 5 planes of the inclined LEO constellation (a total of 45 additional satellites) the capacity of the inclined constellation doubles and greater redundancy is achieved. Similarly, the capacity of the polar constellation can be doubled by launching 72 additional satellites into 6 planes positioned between the 6 planes of the initial polar constellation. Doubling the number of planes also provides the opportunity to seamlessly transition to the next generation by placing satellites with the new technologies into the added planes. Service to user terminals not yet compatible with the new technologies would not be impacted, as these user terminals would continue to connect to satellites in the initial planes. Increasing the capacity of the network in increments of 45 satellites is far more cost-effective than the large increments of the prior art systems.

In addition to standard station keeping and power components, the satellites in both constellations have on-board processors which perform signal regeneration and routing of IP traffic. The satellites also use inter-satellite links (ISL) to connect to adjacent satellites within a constellation and to connect to satellites in the other constellation. This provides maximum flexibility in connectivity as each satellite becomes an IP router, completely interconnected with other satellites which are in line-of-sight. Link performance is therefore improved over existing systems, and capacity is increased. The satellites may also have "store and forward" functionality allowing the satellite to store data when communications to a target satellite or Gateway is not possible. The stored data can then be relayed when communications is possible. The satellites may also carry other payloads such as weather monitoring equipment, but communications is the primary focus of the system.

The hybrid LEO network of the invention may be connected to the terrestrial network through two existing Gateway sites located in the north (in Inuvik, Canada and in Svalbard, Norway). Additional Gateway sites in other parts of the world may be added as required by traffic volume or to address national regulatory requirements. As noted above and as seen in FIG. 1, the planes of the polar LEO constellation converge at the poles, resulting in a high level of availability and excess bandwidth enabling the hybrid constellation to efficiently connect to the terrestrial network. The system of the invention also mitigates on the inefficiency of satellite convergence at the poles by:

- making satellite communication and other services available to northern flight routes;
- adjusting satellite phasing to minimize the extent of satellite convergence; that is, adjusting the relative phasing of the planes such that there is not a satellite from each plane arriving at the northern most point at the same time; and
- using down-time in the polar regions as battery charge time, reducing SWaP (satellite size, weight and power requirements).

Users connect to the hybrid LEO network through one of the satellite's steerable beams each with a diameter of approximately 170 km (preferably generated by a phased array antenna). A broad market can be served in this way, including aeronautical mobile, large fixed enterprise and community broadband.

There is also a separate wide area coverage capability which covers the entire field of view of the satellite such that the LEO network provides global coverage for 100% of the time. Applications include pushing Internet content to the user terminals, broadcast of software updates, and the Internet of Things.

Inter-satellite link (ISL) functionality is provided on all satellites. A simulation was performed which showed that ISL tracking between satellites in the polar and inclined constellations is feasible with current ISL technology. The rate of change in the angle of elevation for the ISL instrument is less than 0.05 degrees per second and rate of change in the angle of azimuth is less than 0.2 degrees per second. The use of ISL reduces the number of Gateways required to two (at Inuvik and Svalbard) as, at the very least, satellites will be able to access the terrestrial network using satellite-to-satellite communications to reach a satellite in a polar LEO constellation, and from there, reach a northern Gateway. Having ISL on all satellites optionally allows point-to-any-point communications without the data passing through a Gateway or a terrestrial network, for demanding users such as the military.

Having ISL on all satellites also allows the system to host client satellites in either the polar LEO constellation or the inclined LEO constellation. A hosted satellite, such as an Earth observation satellite equipped with a compatible ISL capability, can connect to the ISL network and have its data relayed in real-time to a chosen destination. This will avoid delays and congestion caused by downlinking the data only when the satellite is in view of one of its gateways. The polar LEO constellation is particularly useful for electro-optical and infrared imaging satellites.

Figure 3:
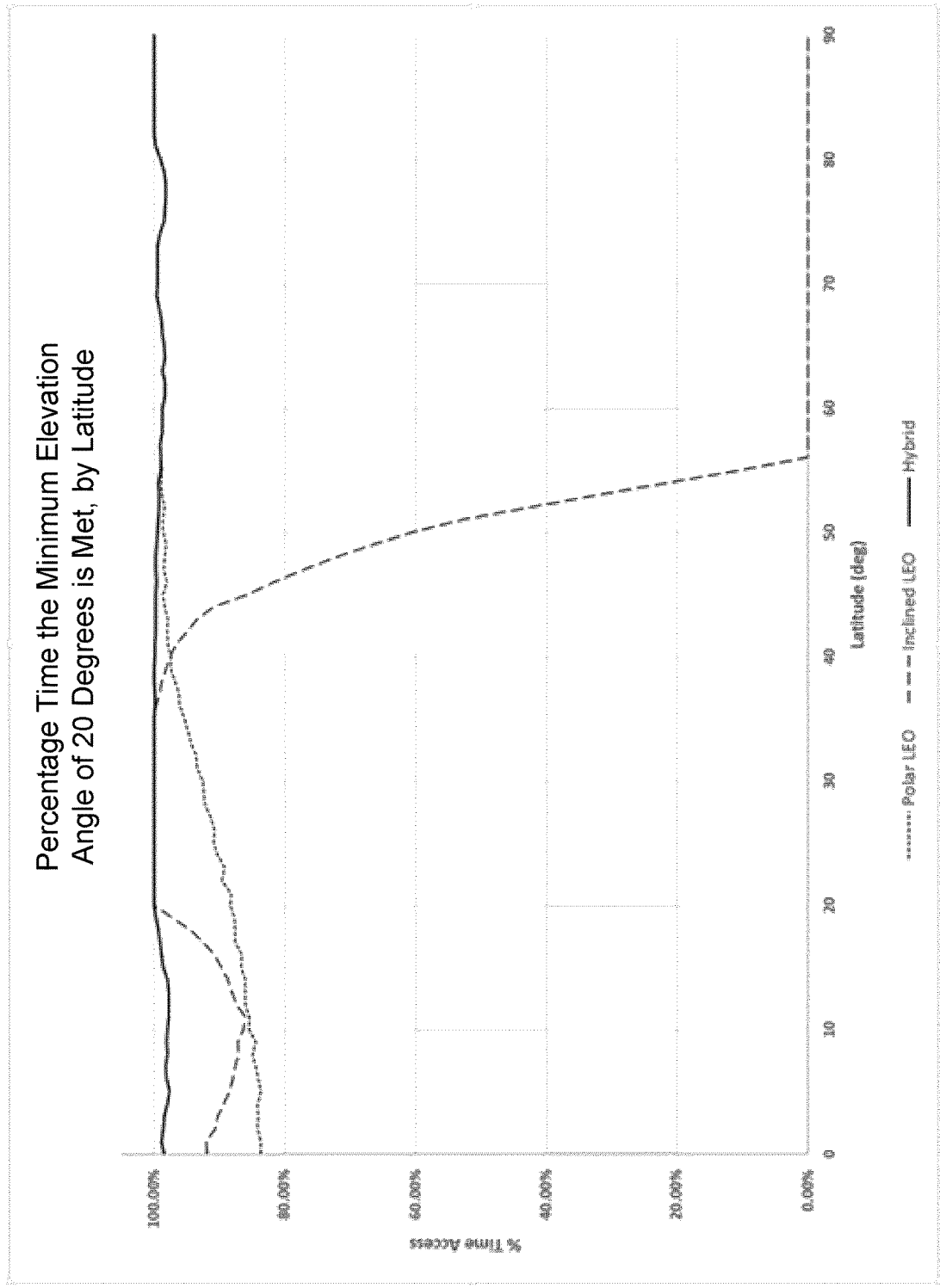
FIG. 3 presents the results of a system simulation showing the percentage of time a minimum elevation angle of 20 degrees is met for latitudes (North and South) between 0 and 90 degrees, for the combined LEO orbits.

The system design allows the minimum elevation angle for the user terminal to be 20 degrees. This is to allow electronically scanned antennas at the user terminal, and to improve the link budgets at the edge of the satellite field of view. Electronically scanned antennas are basically physically flat, solid-state antennas which can be steered electronically. As a result, a user terminal can track a LEO satellite without having to physically move and aim the antenna as required with traditional dish antennas. FIG. 3 shows the result of a simulation which indicates that the hybrid LEO constellation of the invention will provide a minimum 20 degree elevation angle access to at least one satellite, world-wide, for approximately 100% of the time.

The satellite antennas comprise narrow steerable beams which concentrate the satellite resources of power and bandwidth on selected market areas. An additional Wide Area Coverage capability serves the entire field of view of the satellite at 20 degrees elevation. To accomplish this the satellite has a broad fixed beam of approximately 108 degrees beamwidth, pointed directly below the satellite (nadir pointing) capable of covering the satellites field of view to 20 degrees elevation such that the entire globe is covered 100% of the time. When a user terminal requests a higher capacity connection and provides its location (i.e. GPS coordinates), the satellite can be commanded to steer a high capacity narrow beam in the direction of the user terminal. This allows the system of the invention to cover large, sparsely populated areas without consuming a lot of resources which are never used. Steerable beams also allow for the 'stacking' of beams, that is steering more than one beam to cover an area, providing additional power and bandwidth to meet particularly large demands. There are also satellite antennas that provide links to the Gateways, which in this case is V-band. But of course, any suitable frequency band may be used.

The system and method of the invention can also easily accommodate the addition of military Ka-band capability; this will have minimal impact on the satellite payload as spectrum is adjacent to the commercial Ka-band. There is a rapidly increasing demand for high capacity resilient military communications. A LEO constellation is inherently resilient as it consists of a large number of satellites making it difficult for an adversary to disrupt the network. Resiliency is further increased by having ISL which allows the network to connect any two points without the data passing through the terrestrial network. In contrast, GEO constellations can consist of a small number of satellites (approximately 3 to 5) and the loss of any one will cause long-term disruption in service for a significant portion of the world.

The expected market for the system of the invention is any entity which requires wireless broadband services. While the system provides world-wide coverage, certain customers may only require remote access in specific geographic areas. The market may include, for example:

large users, which may require trunking or VSAT;
maritime communications;
aeronautical communications;
broadband connectivity (community aggregate, WIFI hot spots);
cellular backhaul;
pushing Internet content to the user terminals; and/or
Internet of Things.

Inter-Satellite Links (ISL)

An important aspect of the invention is the inclusion of ISL between all of the satellites in the hybrid constellation. ISLs improve flexibility and capacity of the system as it reduces the minimum number of required Gateways by relaying traffic via the polar LEO satellites to major Northern Gateways (such as Inuvik and Svalbard). Though of course, regional Gateways may be used or added when dictated by traffic volume or required by national regulations. Thus, the system:
  allows support for markets in regions where no Gateway is located, for example due to remoteness or regulatory issues;
  allows global connectivity from one country of origin to any other through a single satellite network; and
  allows many types of services to be provided.
As well, having complete ISL communication between all of the satellites allows the system of the invention to host a client's satellite in any of the planes, provided that satellite is equipped with compatible ISL hardware and appropriate routing software.

To maximize the benefits of ISL, larger capacity feeder links with Gateways are required. Thus, V-band, with greater bandwidth available, is preferred.

Radio frequency ISL (RF ISL) could be used, but optical ISL is preferred because of the higher data rates it can support with lower mass and power requirements. Issues of pointing, acquisition and tracking are considerations in the design of optical ISL systems, but these have been resolved for LEO to LEO systems.

There are three particular ISL cases which must be considered in the system of the invention:
  intra-plane connectivity (forward and back);
  inter-plane connectivity (left and right) within same constellation; and
  inter-constellation connectivity (between polar LEO satellites and inclined LEO satellites).

Intra-plane connectivity (forward and back) is easy to perform as the satellites are moving at the same speed and in the same direction. Inter-plane connectivity (left and right) within same constellation is straightforward for inclined orbits as while the satellites are in different planes, they are still moving at the same speed and in the same direction. Inter-plane connectivity (left and right) across the seam of the polar constellation is very difficult, and with only a polar constellation, the seam must be avoided by relaying the data across many polar planes, increasing delays and traffic load. As explained below, the seam of the polar constellation can be bypassed by sending communications through the inclined constellation, rather than across the seam of the polar constellation. And finally, inter-constellation connectivity does require that the satellites locate and track one another, but technology exists to deal with this problem.

Determining the optimum path for the data to travel via satellites with ISL between a user terminal and a Gateway with terrestrial IP network connectivity, or for the data to travel via satellites with ISL between two user terminals without passing through a Gateway, may be accomplished by IP routers on board each satellite. IP router algorithms for handoff, capacity/load management, route management, load balancing and the like are all known and will operate over a satellite network in the same manner as they operate over any other communication network of IP routers. The physical layer being a satellite network does not affect the IP data communication (i.e. the communication layer). The IP data will be routed to a polar LEO satellite if that is the most efficient route for the data to take to reach a Gateway connected to the terrestrial IP network.

The system of the invention does not have the 'seam' problem of systems like the Iridium constellation because data and communication traffic can be routed between the satellites of the polar constellation and the inclined constellation. Technically, there is a seam within the polar constellation of the invention, but the routing software can cross the seam by routing traffic through the inclined constellation. The routing software is aware of all possible ISL connections and routes. If two satellites are moving too quickly with respect to one another, which is the basis for the seam problem, then the routing software will not have this connection available and will simply choose a different route. Thus, with the use of both constellations, and ISL between all of the satellites in both constellations, there is no 'seam' problem to contend with.

As well, known methodologies for management of data and communication traffic over existing networks can equally by applied to the satellite network of the invention. Data could be prioritized so that real time needs are satisfied using more direct connections, with typically higher costs being charged to the user. Conversely, users with less urgent needs may have their data routed through slower channels, at less expense. Other cost, weighting, prioritizing, scheduling and load management models may also be used.

Figure 4:
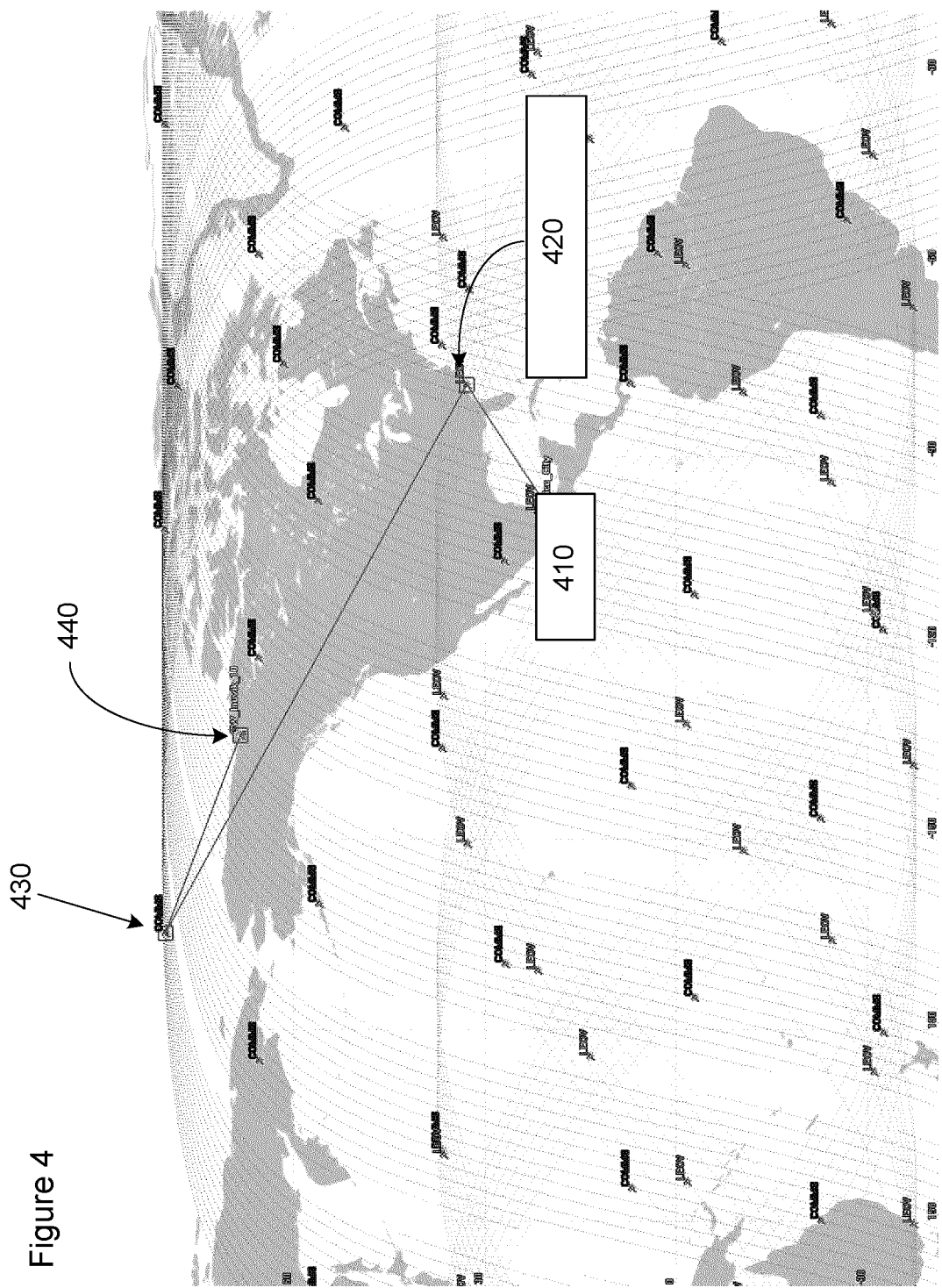
FIG. 4 presents an exemplary schematic diagram for a user terminal in Mexico, connecting to a terrestrial network via the hybrid LEO system of the invention.

For example, if a user 410 in Mexico City wishes to access the Internet, their wireless connection to the system will typically be to a satellite 420 in the inclined LEO constellation as shown in FIG. 4. This first link to the satellite 420 in the inclined LEO constellation will be at Ka-band. This satellite 420 then connects via ISL to a polar LEO satellite 430 in the north that has capacity to communicate with a Gateway 440. The polar LEO satellite 430 then connects to the Gateway 440 at Inuvik using a V-band feederlink. The Inuvik Gateway 440 has terrestrial fibre connectivity, providing broadband Internet access for the user 410.

Avoiding Interference with GEO

As noted above, NGSO (non-geostationary orbit) satellites cannot cause interference to, nor claim protection from, GSO (geostationary orbit) satellites. Article 22 of ITU must be respected to ensure coexistence with Geostationary Satellite Orbit (GSO) Networks, meeting epfd (effective power flux density) limits.

Figure 5:
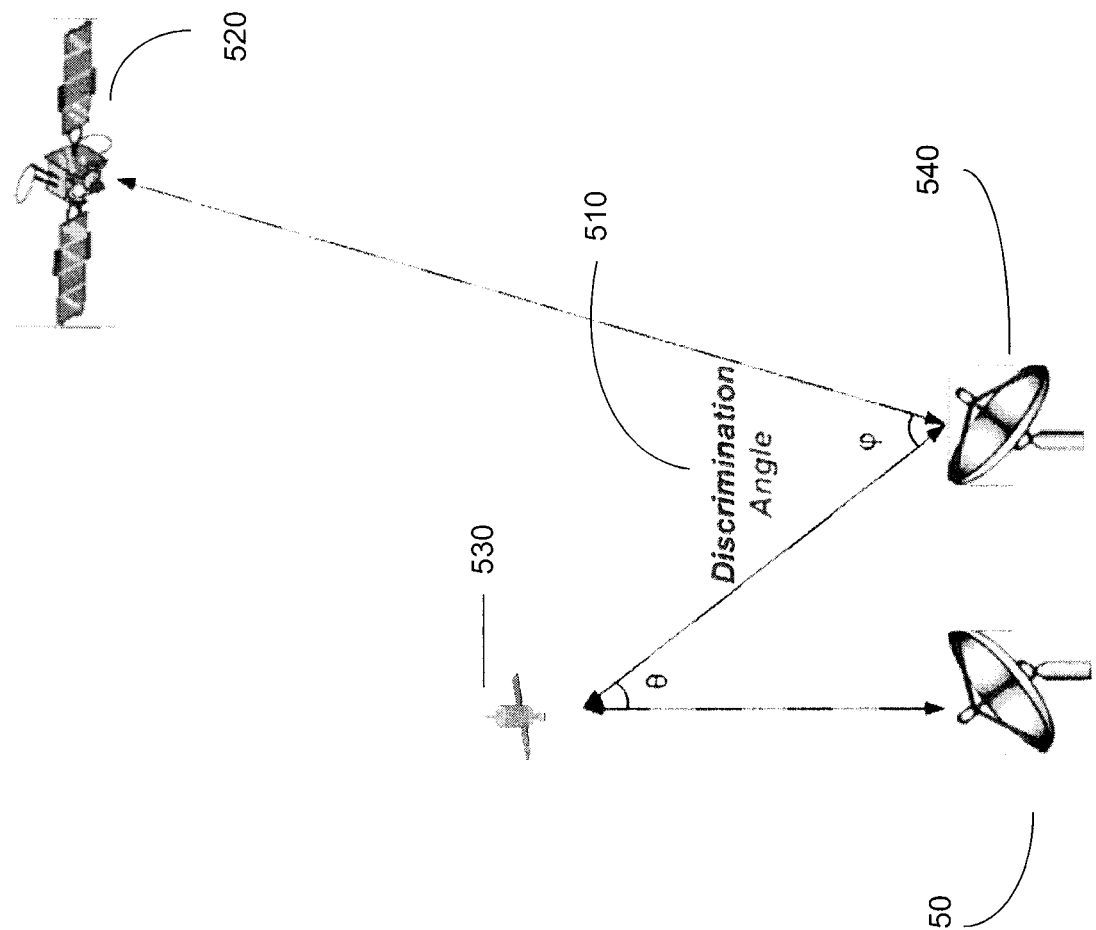
FIG. 5 presents an exemplary schematic diagram showing how interference with GEO satellites is avoided.

Discrimination angles have been calculated based on effective power flux density (epfd) limits. The discrimination angle 510 as shown in FIG. 5 is defined as the angle between the GEO satellite 520 and the LEO satellite 530, as measured at the GEO user terminal 540. The LEO satellite 530 will interfere with the GEO user terminal 540 when its transmitted signal falls within the beam of the GEO user antenna. This occurs when the LEO user terminal 550 and the GEO user terminal 540 are geographically close and the angular separation between the LEO satellite 530 and the GEO satellite 520 is small. The discrimination angle 510 is calculated such that a LEO satellite separated from a GEO satellite at an angle greater than the value of the discrimination angle will not cause unacceptable interference to the GEO terminal. The level of unacceptable interference is determined by the effective power flux density limits defined by the ITU. The satellite constellation of the invention is centrally managed by a Network Management System (not shown) which is in continuous contact with all satellites in the constellation. The NMS has tables containing the locations and frequency of operations of all the GEO satellites and the locations of GEO terminals, either known or assumed making worst case assumptions. With this GEO data coupled with detailed knowledge of the LEO constellation, the NMS can predict a situation of potential interference to the GEO network hours or even days in advance. The interference mitigation technique of switching a user terminal to an alternate LEO satellite, one that has an angular separation with the GEO satellite greater than the discrimination angle, can be planned in advance and efficiently executed without disrupting service to the users. Because the invention uses a combination of polar LEO and inclined LEO orbits there is a high probability there will be a suitable alternate LEO satellite available.

For the wide area coverage beam, which is not steered, the likelihood and degree of interference with GEO ground stations can also be reduced by one or more of the following techniques:
   using frequencies in portions of the Ka band which are less common in GEO systems;
   using a spread spectrum modulation technique to spread the signal over a much larger bandwidth, avoiding interference by reducing the power flux density below the limits set by the ITU;
   as the constellation expands to meet market growth, redundant coverage for the wide area coverage beams in the equatorial regions will mean users may be handed off to a non-interfering satellite; and/or
   the fixed wide area coverage satellite beam can be steered to avoid interference with the GEO network by changing the attitude of the satellite (i.e. body steering).

Because this is a predictable, deterministic situation, rigorous calculations can be performed and these mitigation techniques can be planned for ahead of time.

Other Exemplary Embodiments:

The preferred embodiment of the invention has been described above, but it would be clear to a person skilled in the art that the parameters of the system may be modified and still provide much the same result. Considerations for such modifications include the following:

Inclination: The inclination is the angle between the orbital plane of the satellites, and the plane that passes through the Earth's equator. A polar LEO satellite can be defined as one whose inclination is such that global coverage is achieved, either continuously as with the embodiment of the invention or over a period of time, such as a single satellite in a single plane, usually for Earth observation applications rather than communications. The range in inclination for a polar LEO orbit is approximately 80 to 100 degrees. The preferred inclination of the polar LEO satellites is 99.5 degrees. The inclination of the inclined LEO satellites is determined by the area of the globe the satellite constellation is to serve. For the preferred embodiment of the invention 37.4 degrees has been chosen as a constellation with this inclination can cover the market concentrated between 50 degrees north and 50 degrees south latitude. However the inclination may range between 5 and 75 degrees in some embodiments addressing different market areas.

Planes/Number of Satellites: Having multiple satellites in the same orbital plane is the preferred implementation for a number of reasons. In addition to simplifying the coordination of orbits with ground stations, it also allows multiple satellites to be launched from a single launch vehicle, or increasing the number of satellites in the same plane for redundancy and/or improved performance. The number of planes and the number of satellites in plane may be varied and still meet a design objective, for example global coverage for a polar LEO orbit. This objective can be achieved with 11 satellites in each of 6 planes, 8 satellites in each of 9 planes or, in the preferred implementation, 12 satellites in each of 6 planes. This factor is similar for an inclined LEO orbit, where the preferred implementation is 9 satellites in 5 planes. An example of a variation is 8 satellites in 6 planes. Determining an optimal constellation considers factors such as the minimum elevation angle achieved, the level of redundancy and the relative ease of deployment, while still achieving the coverage objectives. It may be desirable to launch an additional redundant satellite into the same plane in case one satellite fails. Having the redundant satellite in the same plane makes it easier to place it into the proper position and activate it when required. This kind of redundancy is more difficult to achieve as the number of planes increases.

In developing the system of the invention it was initially assumed that one orbital strategy (polar, inclined, Ballard Rosette, etc.) would be found to be optimal, but that was not the case. And even when it was determined that a combination of a polar constellation and an inclined constellation was the best approach for a global communication system, the optimal values for the inclination, number of planes and number of satellites (i.e. a polar LEO constellation of 72 satellites in 6 planes, 99.5 degrees inclination, and altitude of 1000 km, in combination with an inclined constellation of 45 satellites in 5 planes, inclined 37.4 degrees, and altitude of 1250 km) was not predictable. That is, the development of the invention was not simply a matter of one constellation addressing the shortcomings of the other. And furthermore, when these values were manipulated, it was also found the results of those manipulations were not predictable. For example, it was found that:

1. adding another plane to the polar constellation would not significantly improve the minimum elevation angles;
2. increasing the inclination angle of the inclined constellation would not improve the minimum elevation angle without the addition of more satellites,
3. adding more satellites to the existing polar planes would not provide much advantage.

Eccentricity: The eccentricity is the shape of the elliptical path of an orbit, which dictates the altitude of the apogee (the highest altitude) and the perigee (the lowest altitude). By definition, all LEO orbits are circular, so they have an eccentricity of 0.

Altitude: The altitude of LEO satellites is limited on the low end by atmospheric drag, which begins to occur at altitudes less than 800 km and takes additional station keeping fuel to overcome. The maximum altitude is about 1400 km as above this the level of radiation increases, negatively impacting the satellite lifetime. Another factor is space debris which for LEO orbits has a higher concentration between 800 and 1000 km and therefore a higher probability of collision. As noted above, the polar LEO satellites are deployed into an orbit at a preferred altitude of 1000 km, while the inclined LEO satellites are deployed into an orbit at a preferred altitude of 1250 km.

Argument of Perigee: The Argument of Perigee is another parameter for elliptical orbits, describing the orientation of an elliptical orbit with respect to the equatorial plane. Because all LEO orbits are by definition circular, this parameter is not relevant.

Longitude of the Ascending Node: In simple terms, the Longitude of the Ascending Node describes where the orbital plane crosses the Earth's equator. The Longitude of the Ascending Node becomes a factor in specifying the orbit, for example having satellites in adjacent planes offset from one another to optimize the coverage of a constellation. As noted above, it is preferable that the orbital planes of the invention are evenly spaced simply to provide optimal coverage of the Earth. But the orbital planes could be spaced in some other manner.

Orbital Period: The orbital period is determined by a satellite's altitude, which in the case of LEO satellites is in the order of 1.5 hours to 2 hours. When designing LEO orbits, the period is determined by the altitude, which as indicated above may vary between 800 km and 1400 km.

Orbit Control: Satellite constellations of the invention experience changes in the aforementioned orbital parameters over time due the Earth's oblateness, gravitational forces of the sun and moon, and solar radiation pressure. These can be compensated by the satellite's on-board propulsion system. The manner in which this is done is described hereinafter.

Figure 6:
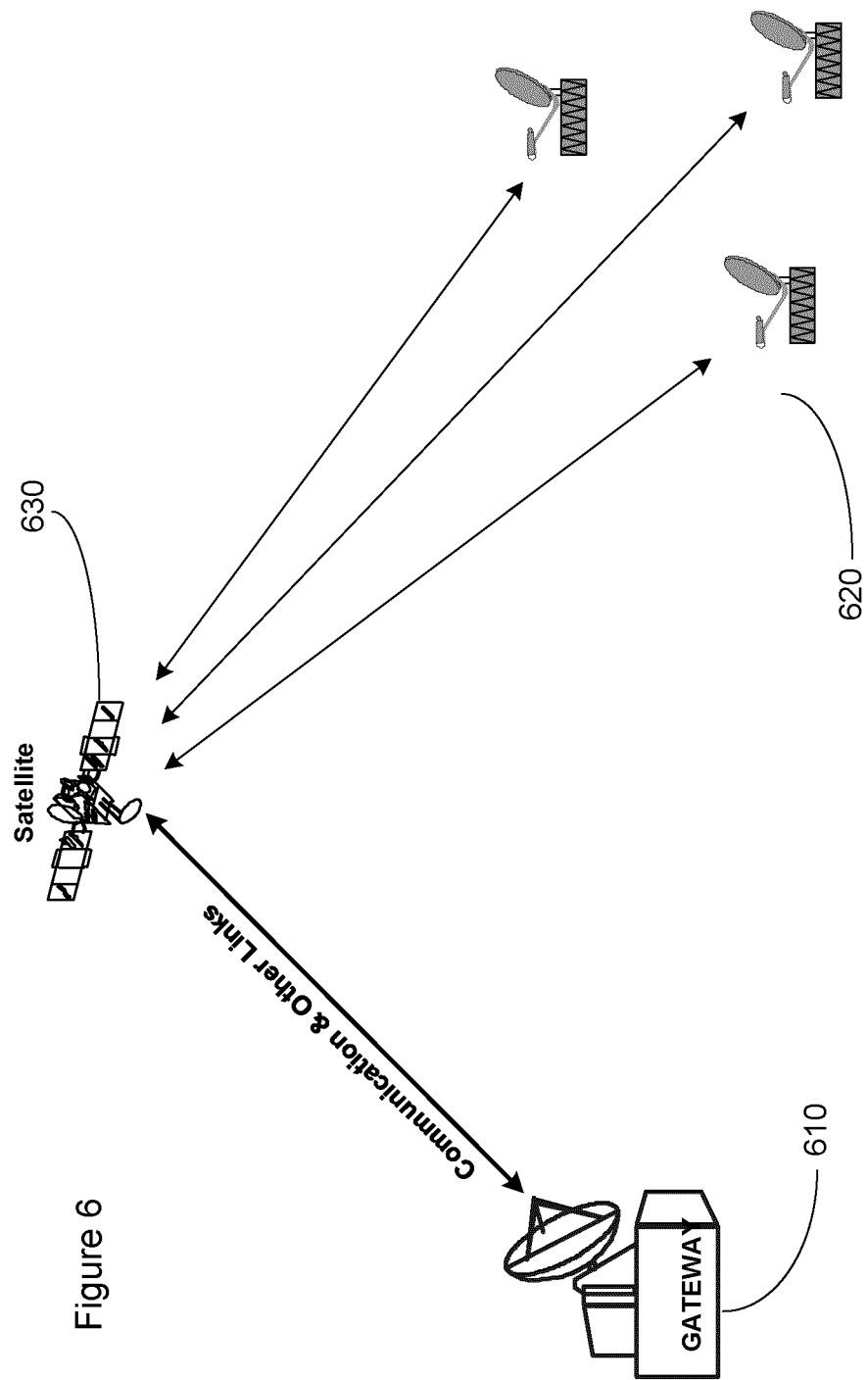
FIG. 6 presents an exemplary network architecture for implementing the invention.

Gateways and User Terminals: As shown in FIG. 6, the system includes a ground based communications network 620 made up of user terminals, LEO satellites 630 with communications functionality and at least one Gateway 610. The Gateway 610 is required to obtain data from the LEO satellites 630 and to effect Telemetry, Tracking & Control (TTC). Directional antennas would be used because of their greater efficiency, requiring the Gateway(s) 610 to track the LEO satellites 630 across the sky. Tracking technology is well known in the art. Handoff from one satellite to the next as they move across the sky would not require any interaction for the user. Handoff can be affected using known techniques. Similarly, the user terminals of 620 must acquire and track a satellite and accomplish handoffs between satellites.

Standard satellite communication bands may be used, including: L-Band (1-3 GHz); X band (approximately 7-8 GHz); Ku Band (approximately 11-15 GHz), and Ka Band (approximately 17-31 GHz). Error correction, encoding and re-transmission of lost/corrupted packets would also be used.

As explained above, the system of the invention provides advantages over prior satellite constellation systems in addressing the 'seam' problem, exploiting extra communication resources available in polar regions, allocation of power and bandwidth to targeted markets, and in that the capacity can be increased incrementally, with the addition of a comparatively small number of satellites. Additional advantages of the system include at least the following:

complete world-wide coverage is provided with a smaller number of satellites compared to other methods;

no GEO or MEO satellites are required, so there are no issues with latency, power requirements, antenna sizes and poor polar coverage associated with GEO and some MEO constellations;

secure direct user terminal to user terminal connectivity without the data passing through a Gateway or through an intervening terrestrial network (this is done in the Krebs system referred to in the Background of the Invention); and no HEO satellites are required, so there are no issues with latency or, as with some HEO constellations, exposure to the Van Allen Belts.

With regard to the first bullet point, "LEO: Roar or Whimper; Low Earth Orbit Broadband Constellations: Technical and Economic Truths" ICG, notes that the Teledesic system of 650 satellites in a polar constellation will have roughly 15 satellites serving Africa at any one time (2.3% of the constellation). In contrast, the polar constellation of the invention, despite having only 72 satellites but using steerable beams, will provide an average of 12.1 satellites serving Africa at any one time (16.9% of the constellation), and a minimum of 9 satellites (12.5% of the constellation). The combination of the polar and inclined constellations of the invention, of course, will provide even better coverage.

Orbit Control

Satellite constellations of the invention will experience changes in the aforementioned orbital parameters over time due to the Earth's oblateness, gravitational forces of the sun and moon, and solar radiation pressure. These can be compensated by performing periodic orbit-correction maneuvers (i.e. "station keeping" maneuvers) using the satellite's on-board propulsion system.

The size of each orbital correction will be determined by the thrust and duration of the "delta-v" maneuvers ("delta-v" is merely an aerospace term for a change in velocity). Because longer maneuvers are less efficient, it will be preferable to perform frequent, short-duration maneuvers rather than less-frequent, long-duration maneuvers. For satellites equipped with chemical (bi-propellant) propulsion systems, the achievable thrust will be large enough to allow several days or even weeks between maneuver pairs. For satellites utilizing high-efficiency, low-thrust ion thrusters, maneuvers may be performed during every orbit revolution.

Computer software systems are known to manage other satellite flight systems and could easily be modified to accommodate the orbits described herein.

Figure 7:
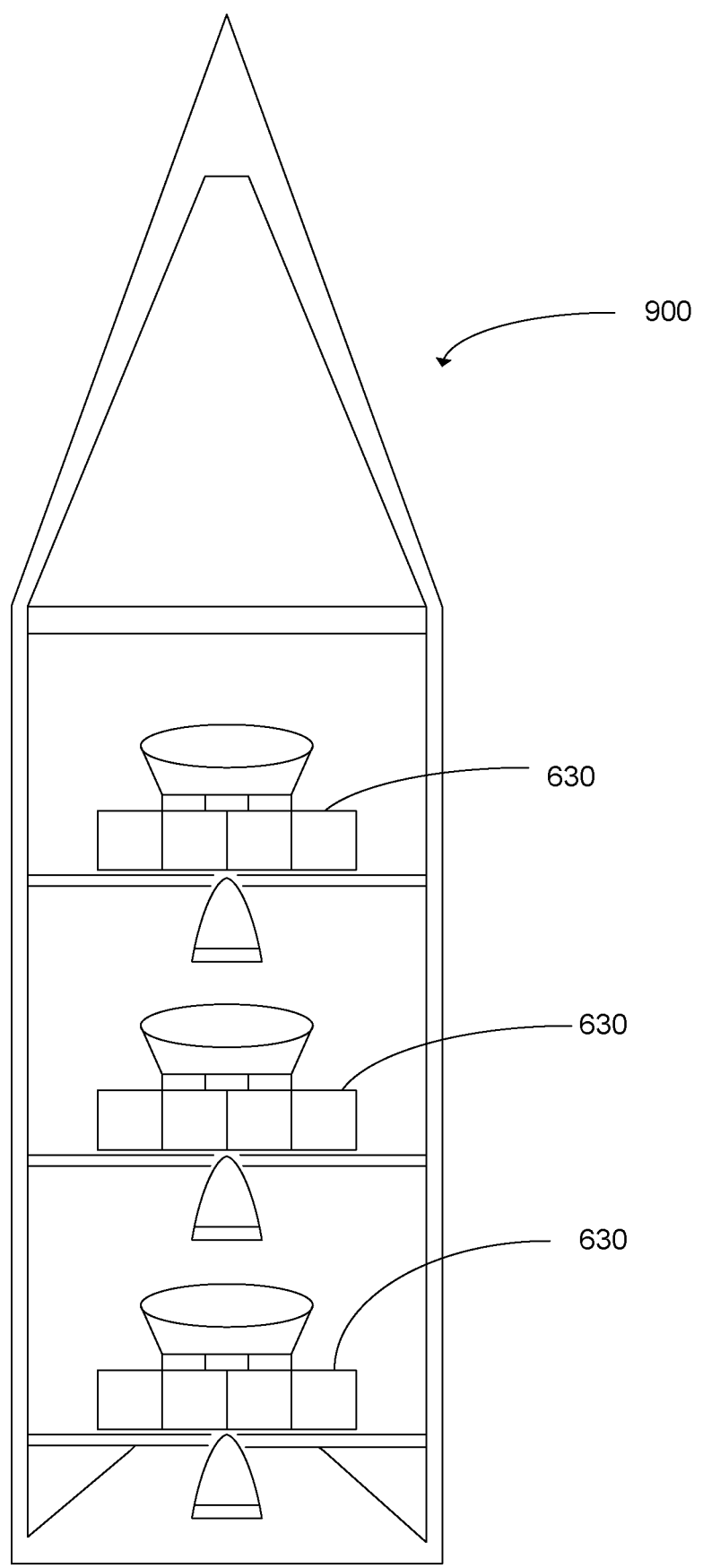
FIG. 7 presents an exemplary payload arrangement for a launch vehicle.

FIG. 7 presents a cross-sectional view of an exemplary payload 900 for a launch vehicle (not shown) containing three satellites 630. A much larger number of satellites is possible, depending on the mass of a satellite and the capability of the launch vehicle. 25 satellites per launch vehicle is a practical number for the system of the invention. The launch vehicle will include a sufficient number of propulsion stages, of sufficient capacity, to carry the satellites 630 into the desired orbit, or into a position from which the satellites 630 can reach their operational orbits (i.e. two propulsion stages, three stages, etc.). The launch vehicle may carry multiple satellites 630 into a lower altitude parking orbit. The lower altitude parking orbit rotates about the Earth with respect to the operational orbit, known as differential nodal regression, and at an optimal point a satellite 630 may propel itself into the operational orbit. Alternatively, the launch vehicle may launch satellites 630 directly into their operational orbit.

As will be described with respect to FIG. 10, each satellite 630 will include a communications system, a control system and a propulsion system. Regardless of what configuration of launch vehicle is used, these systems allow the satellites 630 to communicate with the Gateway 610, and position themselves into their final operational orbits, and their proper position within the constellation.

Figure 8:
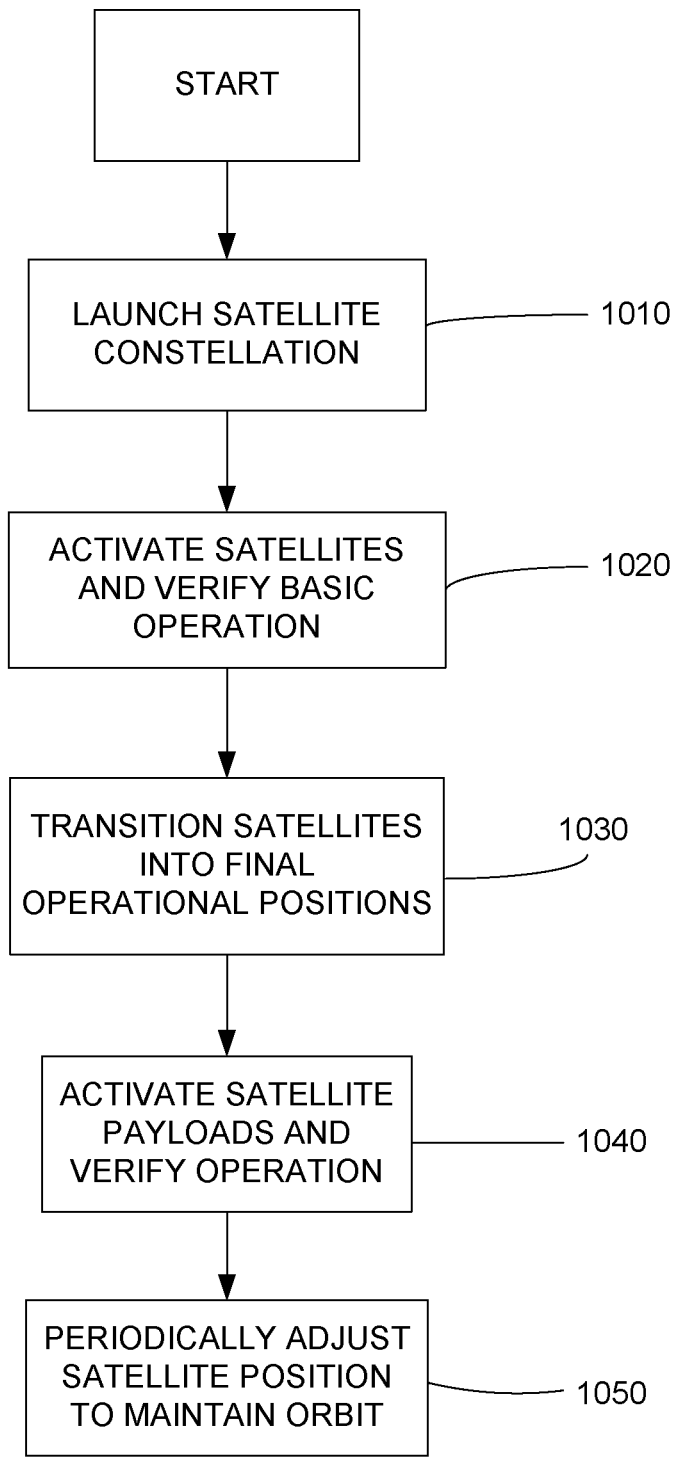
FIG. 8 presents a flow chart of an exemplary method of implementing the invention.

Satellite Activation and Commissioning:

Referring to FIG. 8, once the satellite constellation has been launched 1010 by the launch vehicle, the satellites 630 may be activated and a commissioning/testing procedure of the basic systems performed 1020. This commissioning/ testing procedure may include deploying antennas and rotating the satellite 630 so that the satellite 630 is pointed in the appropriate direction, deploying solar panels, energizing processors and electronic systems, booting-up software systems, and verifying operation of all basic systems and subsystems. It may also be necessary to perform trouble-shooting and/or corrective measures as part of this procedure.

Once the basic systems and subsystems have been activated and their operation verified, the satellites 630 may be transitioned into their final orbital positions 1030. As described above, this may comprise the satellites 630 simply propelling themselves into the correct nodal separations, if they were launched into the same operational orbit. Alternatively, if the satellites 630 were launched into a parking orbit, they may be required to consume a much larger quantity of fuel to propel themselves into their operational orbit and nodal separation.

With the satellites 630 now in their final orbital positions, the payloads may be activated, commissioned and tested 1040. This would be done in much the same manner as the activation, testing and commissioning of the satellites' basic systems described above, i.e. deploying any necessary antennas or sensors, energizing processors and electronic systems, booting-up software systems, and verifying operation of all the payload systems and subsystems. Of course, trouble-shooting and/or corrective measures may also be performed as part of the payload commissioning procedure.

The satellites 630 are now in an operational mode. Operation of the payload will be determined completely by the nature of the payload.

With all of the satellite systems and payload operational, the only remaining concern is to maintain the position of the satellite 630 in the orbit of interest 1050. This can be effected in the manner described above under the heading "Orbit Control". Satellite position information may be determined by the satellite 630, a Gateway 610 or some other control center. Typically, satellite position information may be calculated from global positioning system (GPS) data and/or from other satellite telemetry.

Optionally, certain systems and subsystems may be deactivated in the course of the satellites' orbits, for example, to conserve power or to protect instrumentation. For example, a communications payload may be active only when serving parts of the Earth where users are present. At other times it may be desirable to deactivate the payload systems, re-activating it as it re-enters the region of interest. It may be desirable to keep the basic satellite subsystems operational at all times, so that it may continue to receive and transmit data related to its health, status and control. It may also be desirable to recharge a satellite's batteries during these quiescent periods.

Figure 9:
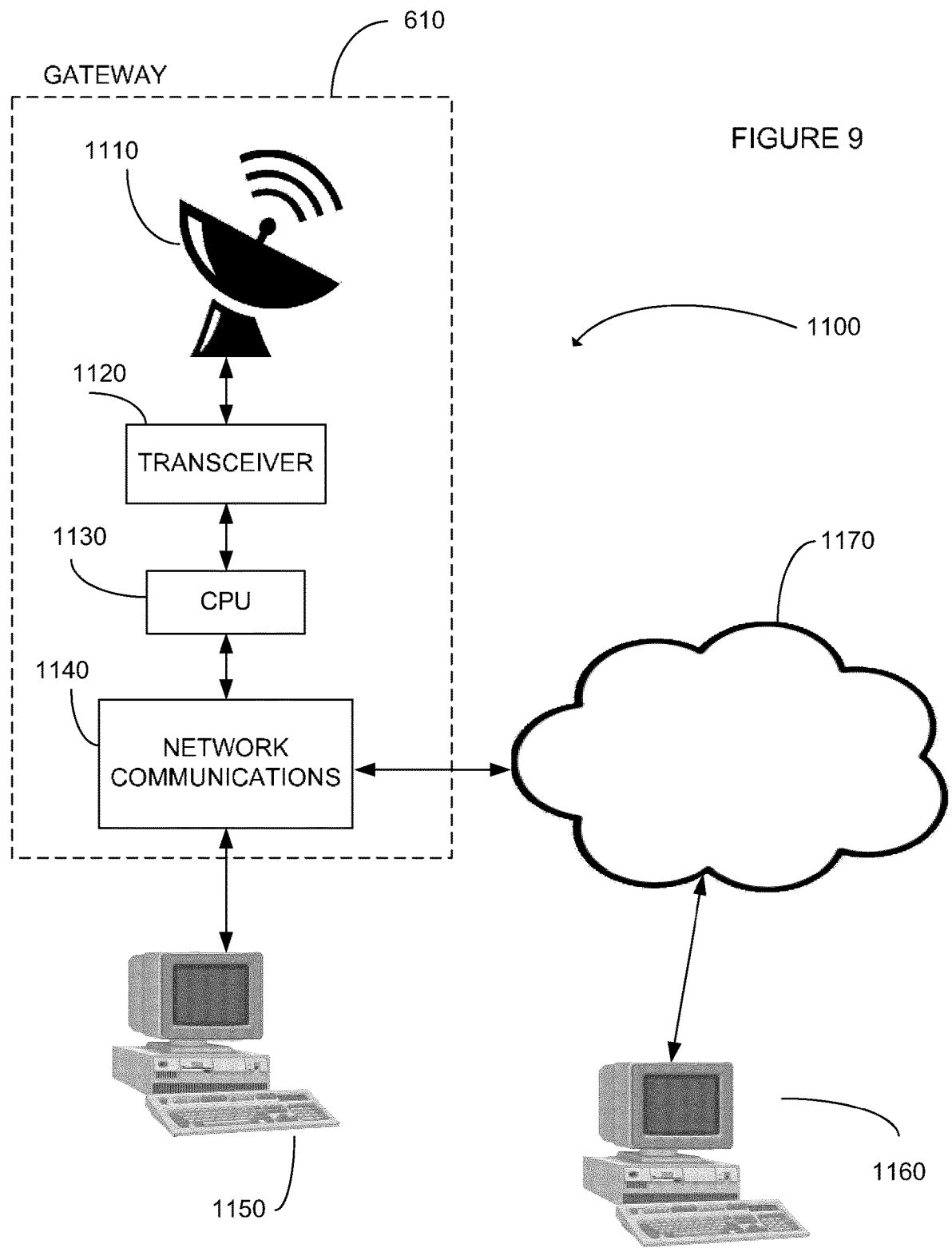
FIG. 9 presents a block diagram of an exemplary Gateway in an embodiment of the invention.

Gateway Design:

FIG. 9 illustrates a simplified block diagram of an exemplary Gateway system 1100 for communicating with the satellites 630. The communication signals may include operational/control signals and payload related signals. In the case of a scientific payload, the payload related signals may include control signals transmitted to instruments, and observation/monitoring data received from the instruments. The Gateway system 1100 may be modified to receive and present other types of information, and may be used in conjunction with one or more computers, servers, networks and other related devices.

As shown in FIG. 9, the Gateway system 1100 may include an antenna 1110, a transceiver 1120, a processing unit or system 1130, and a network communications system 1140.

The antenna 1110 is designed to receive and transmit signals at the desired communication frequencies. Typically, the antenna 1110 will be a highly-directional, tracking antenna, in the interest of maintaining effective broadband communication levels.

The Gateway transceiver 1120 consists of a receiver portion for receiving data from the satellites and preparing it for the CPU 1130, and a transmission portion for process data from the CPU 1130, preparing it for transmission to the satellites 630 via the antenna 1110. The transmitting portion of the transceiver 1120 may, for example, multiplex, encode and compress data to be transmitted to the satellites 630, then modulate the data to the desired transmission frequency and amplify it for transmission. Multiple channels may be used, error correction coding, and the like. In a complementary manner, the receiver portion of the transceiver 1120 demodulates received signals and performs any necessary demultiplexing, decoding, decompressing, error correction and formatting of the signals from the antenna, for use by the CPU 1130. The antenna and/or receiver may also include any other desired switches, filters, low-noise amplifiers, downconverters (for example, to an intermediate frequency), and other components.

A local user interface 1150 is also shown in FIG. 11. The geographic positions of the Gateway(s) 610 may be chosen to minimize the number of Gateways required. As a result, the Gateway(s) 610 may not be in a geographic location that is convenient for the satellite operators and/or parties receiving the payload data. Thus, the Gateway(s) 610 will typically be provided with network communication facilities 1140 so that remote computers 1160 may be used to access the system over the Internet or similar networks 1170.

Satellite Design:

FIG. 10 illustrates a simplified block diagram of a satellite 630 which may be used in an exemplary embodiment of the invention. As shown, the satellite 630 may include a station keeping system 1210, a propulsion system 1220, a power system 1230, a communications system, a computer processing system 1240 and a payload 1250. The communications system will typically consist of a transceiver 1260 (or transceivers) and a set of antennas 1270. Of course, other components and arrangements may be used to implement the invention, including, for example, redundant and back-up components.

The station keeping subsystem 1210 is responsible for maintaining the satellite's orbit. Accordingly, the station keeping subsystem 1210 may calculate and/or receive attitude and/or orbit adjustment information, and may actuate the propulsion system to adjust the satellite's attitude and/or orbit. Maintaining the orbit may also include maintaining the desired nodal separations between itself and the other satellites within the satellite constellation. The propulsion system 1220 may include for example, a fuel source (i.e. fuel and oxidant tanks) and liquid fuel rocket, or an ion-thruster system.

The power subsystem 1230 provides electrical power to all of the satellite systems and subsystems. The power subsystem 1230 may, for example, include one or more solar panels and a supporting structure, and one or more batteries.

The set of satellite antennas 1270 would be designed to accommodate the communications frequencies and systems required to provide the ISL, narrow steerable beams (for example, 16 electronically steerable beams per satellite) and Wide Area Coverage beams described above to serve the users, and antennas to connect to the Gateways. In view of the physical size and weight constraints of the satellite, these antennas will be much smaller than the antenna 1110 of the Gateway 610. The direction of the beams of the set of antennas 1270 are controlled by mechanically steering the antenna or electronically steering the antenna beam. Alternatively, the satellite attitude may be controlled to steer the set of antennas 1270.

Similarly, the satellite transceiver 1260 is designed to be complementary to that of the Gateway 610 and user terminals 620, consisting of a receiver portion for receiving data from the Gateway 610/user terminals 620 and preparing it for the CPU 1240, and a transmission portion for process data from the CPU 1240, preparing it for transmission to the Gateway 610/user terminals via the set of antennas 1270. As well, the satellite transceiver 1260 is designed to be complementary to those of the other satellites so that ISL can be effected.

The transmitting portion of the transceiver 1260 may, for example, multiplex, encode and compress data to be transmitted, then modulate the data to the desired transmission frequency and amplify it for transmission. Multiple channels may be used, error correction coding, and the like. The receiver portion of the transceiver 1260 demodulates received signals and performs any necessary demultiplexing, decoding, decompressing, error correction and formatting of the signals from set of antennas 1270, for use by the satellite CPU 1240. The set of antennas and/or transceiver may also include any other desired switches, filters, low-noise amplifiers, downconverters (for example, to an intermediate frequency and/or baseband), and other components.

The CPU system 1240 of the satellite 630 typically receives signals used for operation of the attitude and orbit control systems. It also receives control signals for operation of the payload 1250, and processes payload data for transmission to the Gateway 610. It may also manage activation and deactivation of the various subsystems as the satellite 630 passes into and out of the geographic region of interest. If the satellite 630 is intended to operate as an IP router, the functionality to do so may either be as part of the CPU system 1240 or as part of the payload 1250.

Options and Alternatives:

The system of the invention may be applied to at least the following applications:
1. Communications applications such as machine to machine, some communications protocols, including next generation cellular networks 4G and 5G require low latency that cannot be adequately served from satellites in GEO;
2. Maritime and air traffic currently must switch from geostationary communications to unreliable and low bandwidth HF (high frequency) radio communications when at high latitudes beyond the reach of satellites in geostationary orbit. The system of the invention could support broadband communications, navigation and surveillance with aircraft and ships in these areas. There are currently 700 aircraft per month using polar routes and continuous coverage over the north circumpolar region is required to improve safety and efficiency of air traffic in the area, as well as broadband connectivity for passengers;
3. Earth Observation: These payloads can perform well in the described orbits and provide global monitoring of weather, greenhouse gases, and ocean color radiometry, as examples;
4. Space Situational Awareness: These payloads can detect space hazards such as debris and asteroids as well as other satellites which may be considered hazards; and
5. Space Weather: The orbits of the invention can support space weather payloads which measure such factors as solar radiation, and the Earth's ionosphere.

Conclusion:

One or more currently preferred embodiments have been described by way of example. It will be apparent to persons skilled in the art that a number of variations and modifications can be made without departing from the scope of the invention as defined in the claims. For example, the selection of the inclination, altitude and number of satellites is dependent on the tradeoffs between the required service areas, the amount of fuel on the spacecraft and the launch mass of the payload. These parameters can be optimized to accommodate different priorities, without departing from the concept of the invention.

The method steps of the invention may be embodied in sets of executable machine code stored in a variety of formats such as object code or source code. Such code may be described generically as programming code, software, or a computer program for simplification. The embodiments of the invention may be executed by a computer processor or similar device programmed in the manner of method steps, or may be executed by an electronic system which is provided with means for executing these steps. Similarly, an electronic memory medium such computer diskettes, hard drives, thumb drives, CD-ROMs, Random Access Memory (RAM), Read Only Memory (ROM) or similar computer software storage media known in the art, may be programmed to execute such method steps.

All citations are hereby incorporated by reference.

What is claimed is:

1. A satellite system for global communications comprising:
 a first set of satellites in a polar LEO (low Earth orbit) constellation; a second set of satellites in an inclined LEO constellation;
 a first user terminal for transmitting to, and receiving signals from, said first and second set of satellites; and
 a Gateway, a base station or a second user terminal for transmitting to, and receiving signals from, said first and second set of satellites;
 each of said first and second set of satellites having an ISL (inter-satellite link) functionality with respect to satellites in the polar LEO constellation and with satellites in the inclined LEO constellation;
 wherein the Gateway, the base station, or the second user terminal are operable to avoid interference with a GEO satellite user terminal by switching the Gateway, the base station or the second user terminal to an alternate LEO satellite that has an angular separation with a GEO satellite greater than a calculated discrimination angle, as measured at the GEO user terminal.

2. The satellite system of claim 1, wherein said polar LEO constellation comprises six planes, equally spaced.

3. The satellite system of claim 2, wherein said planes of said polar LEO constellation are inclined between 80 degrees and 100 degrees.

4. The satellite system of claim 3, wherein said planes of said polar LEO constellation are inclined about 99.5 degrees.

5. The satellite system of claim 1, wherein said inclined LEO constellation comprises five planes, equally spaced.

6. The satellite system of claim 5, wherein said planes of said inclined LEO constellation are inclined between 5 degrees and 75 degrees.

7. The satellite system of claim 6, wherein said planes of said inclined LEO constellation are inclined about 37.4 degrees.

8. The satellite system of claim 1, wherein said polar LEO constellation comprises about 72 satellites and said inclined LEO constellation comprises about 45 satellites, the system thereby providing global coverage with a minimum elevation angle of about 20 degrees.

9. The satellite system of claim 1, wherein said satellites of said polar LEO constellation orbit at an altitude of between 800 km and 1400 km.

10. The satellite system of claim 9, wherein said satellites of said polar LEO constellation orbit at an altitude of about 1000 km.

11. The satellite system of claim 1, wherein said satellites of said inclined LEO constellation orbit at an altitude of between 800 km and 1400 km.

12. The satellite system of claim 11, wherein said satellites of said inclined LEO constellation orbit at an altitude of about 1250 km.

13. The satellite system of claim 1, wherein excess capacity in the polar LEO constellation in the higher latitudes is used to transfer data traffic, via the ISL, from both LEO constellations to a Gateway located in the North for a connection to a terrestrial network.

14. The satellite system of claim 1, each of said first and second set of satellites having an IP router functionality.

15. The satellite system of claim 14, each of said first and second set of satellites having an IP router load management functionality.

16. The satellite system of claim 1, wherein said communications comprises broadband communications.

17. The satellite system of claim 1, wherein said first user terminal includes an electronically scanned array antenna for communicating with said first and second set of satellites.

18. A method of operation for a global communications satellite system for comprising:
    launching a first set of satellites in a polar LEO (low Earth orbit) constellation; launching a second set of satellites in an inclined LEO constellation; using a user terminal, transmitting communications data to a first satellite in said first or second set of satellites;
    communicating said communications data from said first satellite, to a second satellite in said first or second set of satellites using an ISL (inter-satellite link);
    transmitting said communications data from said second satellite, to a polar Gateway; and
    avoiding interference with a GEO satellite user terminal by switching the polar Gateway to an alternate LEO satellite that has an angular separation with a GEO satellite greater than a calculated discrimination angle, as measured at the GEO satellite user terminal.

* * * * *